United States Patent [19]

Korsell

[11] 4,337,216
[45] Jun. 29, 1982

[54] DEVICE IN AN EVAPORATIVE COOLER
[75] Inventor: Lars E. R. Korsell, Stockholm, Sweden
[73] Assignee: Aktiebolaget Carl Munters, Sollentuna, Sweden
[21] Appl. No.: 114,199
[22] Filed: Jan. 22, 1980

Related U.S. Application Data
[63] Continuation of Ser. No. 944,248, Sep. 21, 1978, abandoned.

[30] Foreign Application Priority Data
Sep. 22, 1977 [SE] Sweden .................................. 7710655

[51] Int. Cl.³ .............................................. F28C 1/04
[52] U.S. Cl. ............................ 261/112; 261/DIG. 11; 261/DIG. 77
[58] Field of Search ................................ 261/110-112, 261/DIG. 11, DIG. 77; 55/257 PV, 241, 26 D, 440; 165/166

[56] References Cited
U.S. PATENT DOCUMENTS

| | | | |
|---|---|---|---|
| 1,987,881 | 1/1935 | Von Seggern et al. | 261/112 |
| 2,485,849 | 10/1949 | Simmons | 261/112 |
| 3,044,237 | 7/1962 | Mart | 55/257 PV |
| 3,226,098 | 12/1965 | Shryock | 55/440 |
| 3,374,992 | 3/1968 | Greer | 261/DIG. 11 |
| 3,402,105 | 9/1968 | Sze | 261/112 |
| 3,415,502 | 12/1968 | Munters | 261/DIG. 11 |
| 3,792,841 | 2/1974 | Munters | 261/DIG. 11 |
| 3,795,388 | 3/1974 | Toth | 261/112 |
| 3,983,190 | 9/1976 | Norback | 261/DIG. 11 |
| 3,997,635 | 12/1976 | Hallgren | 261/DIG. 11 |

FOREIGN PATENT DOCUMENTS

| | | | |
|---|---|---|---|
| 461944 | 6/1928 | Fed. Rep. of Germany | 261/112 |
| 1179245 | 1/1970 | United Kingdom | 261/112 |
| 1320500 | 6/1973 | United Kingdom | 261/112 |

Primary Examiner—Gregory N. Clements
Attorney, Agent, or Firm—Curtis, Morris & Safford

[57] ABSTRACT

In an evaporative cooler having a casing, a multilayer type contact body and means for supplying water to selected channels in the contact body, the top edges of the contact body are formed to define outwardly widened openings communicating with only selected channels in the body. The water supply means supplies water to only some of the openings so that alternating channels on the contact body are passed with both water and air and the remainder only with air. As a result the formation of mist at the discharge end of the cooler can be avoided.

2 Claims, 7 Drawing Figures

DEVICE IN AN EVAPORATIVE COOLER

This is a continuation of application Serial No. 944,248 filed Sept. 21, 1978, now abandoned.

The present invention relates to a device in an evaporative cooler, such as a cooling tower, which comprises at least one contact body of the multi-layer type housed in a casing and having gaps existing between the layers through which air and water are passed in countercurrent relation.

With coolers of the kind stated by way of introduction there exists the problem, especially at low air temperatures, that the moist air produced in the cooling tower when escaping into the atmosphere forms mist clouds by condensation of steam. To counteract this formation of mist annoying the surroundings it is known to intermix the moist air leaving the cooler with another preheated air stream. According to U.S. Pat. No. 3,997,635, this other heated air stream is obtained by excluding some of the channels or passages of the cooler from the supply of water, whereby the air in those channels will be heated by the heat-conductive contact with the coat of water in adjacent channels. In the discharge from the contact body the heated air is intermixed with the moist air at such a proportion that the mixture of air when re-entering the atmosphere will not form any mist.

It has been proved that by use of the method and device according to U.S. Pat. No. 3,997,635 can effectively prevent mist formation by evaporative coolers. However, there still exists the problem of how, in a simple and effective manner, to provide devices for subdividing the contact body into channels or gaps to which water is supplied, and channels or gaps which are kept dry, i.e., which are excluded from the water supply.

Thus, one main object of the present invention is to provide a simple and effective device in evaporative coolers for subdividing the contact body into dry and wet channels.

Another object of the invention is to provide a simple water supply to the wet channels of the compact body.

A further object of the invention is to provide a device by which overflow of water from the wet to the dry channels is prevented.

A still further object of the present invention is to provide means preventing splashing from the wet channels to be propagated into the dry heated air. In this connection, there may be mentioned that a conventional drop eliminator cannot be operated in the air mixture, but should much impair the result, since it should act as a moistener to the air leaving the dry channels.

These and other objects are attained by the device according to the invention having received the characteristics stated in the appended claims.

Further objects, characteristics and advantages of the invention will become apparent from the following description in connection with the drawings which show preferred embodiments of the invention.

Figure 1:
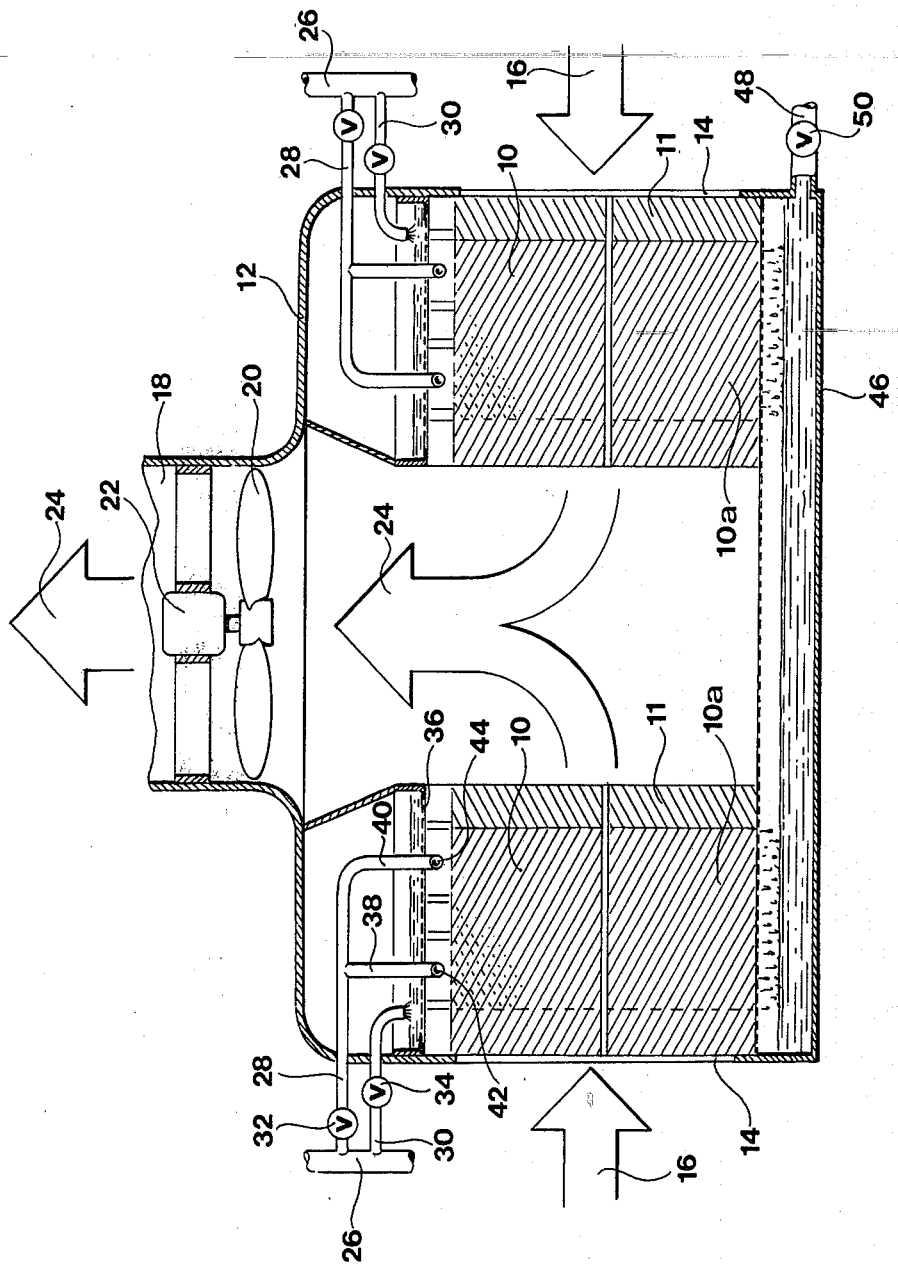
FIG. 1 shows a vertical section through an evaporative cooler, such as a cooling tower of the cross-current type, to which the invention has been applied.

The cooling tower shown in FIG. 1 comprises a casing 12 which houses several contact bodies 10 each of which is composed of layers or sheets 52, 54 (see also FIG. 3) which are disposed in parallel so as to form between them vertical gaps or channels. In the shown embodiment the layers are all corrugated with the corrugations crossing one another in every second layer, as is indicated with dashed lines in the upper part of the contact body 10. All corrugations extend with an angle to the vertical line and bear against one another at the pointwise distributed places of contact. This structure is known from e.g. the U.S. Pat. Nos. 3,682,747 and 3,415,502. The layers may be of plastic or other material which is scarcely permeable to water.

The casing 12 is at opposite sides formed with lateral openings 14 for atmospheric air which enters in the direction of the arrow 16. The casing 12 has at its top a discharge opening 18 within which is provided an impeller 20 which is driven by a motor 22. The atmospheric air sucked in through the lateral openings 14 will thus be caused by the impeller 20 to flow in a mainly vertical direction upwards after the passage through the contact bodies 10 as indicated by the arrows 24. Positioned above the contact bodies 10 are water distributing systems which comprise a main 26 and branch pipes 28 and 30, which are equipped with valves 32, 34 for control or stopping of the water supply. The branch pipe 30 opens into a trough 36 positioned above the contact body 10 and having a perforated bottom for downward flow of the water into the contact body. The other branch pipe 28 is divided into further branches, of which two, denoted 38, 40, are shown in the drawing. These two branch pipes open into distributor pipes 42, 44 mounted horizontally in the top face of the contact body as will be explained in connection with the description of FIG. 3.

The cooled water which has passed through the contact bodies 10, is collected in a sump 46 at the bottom of the cooling tower and is discharged through a pipe 48 controlled by a valve 50 to the place of utilization. Upon renewed heating at the place of utilization the water is returned through the main 26 to the cooling tower to be supplied to the contact bodies 10, the water then flowing in downward direction through the gaps and there meeting the upwards advancing air, the water thereby being cooled and the air taking up moisture until saturation.

In normal operation during the warmer season, when the demand on cooling capacity is greatest, full utilization of the evaporative capacity of the cooling tower is rendered possible so that all water is supplied from the main 26 via the branch pipes 30 to the trough 36 from which it is distributed over the entire top face of the contact body. If, however, the temperature of the cooling water when entering the tower is so high in relation to that of the atmospheric air, for example at a relatively low air temperature, that the escaping saturated air when returning into the atmosphere should precipitate steam in the form of clouds of mist, the water is supplied through the branch pipes 28 and 38, 40 to the distribution pipes 42, 44 from where it is fed into, e.g., every second gap between the layers of the contact body 10. According to the present invention, this is accomplished by a specific design of the top side of the contact body which is shown in FIG. 3.

Figure 3:
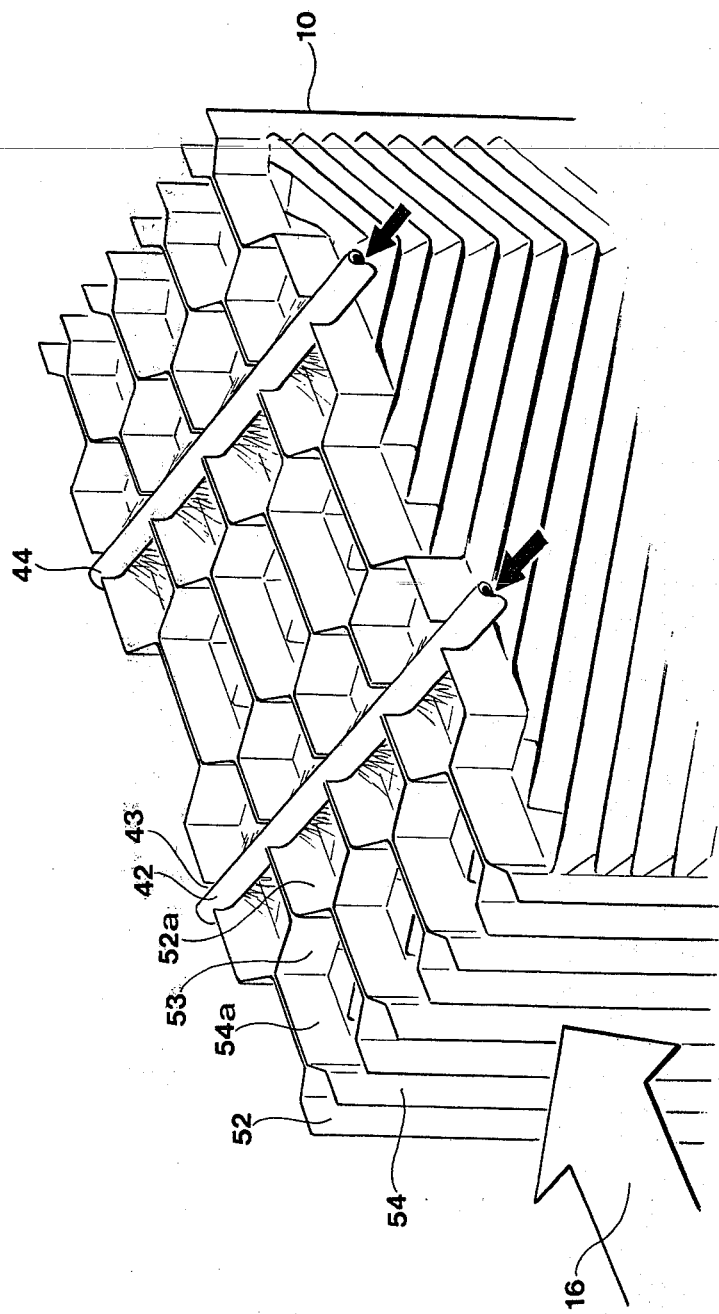
FIG. 3 is a perspective view of the top part of a contact body for the cooler of FIG. 1.

The contact body in FIG. 3 consists, as described above, of corrugated layers 52, 54 which are disposed in parallel so that between them vertical gaps or channels are formed. The layers which are manufactured by vacuum forming or pressing, for example, are formed, according to the invention with widened portion 52a or 54a, respectively, which portions are recurrent with even spacing and interconnected by an intermediate portion 53. When the layers are assembled to form the contact body, these widened portions 52a, 54a, 53 will together form a box-shaped, funnel-like mouth which is open downwards towards the gaps or the channels existing between the layers. The widened portions 52a, 54a projecting in opposite directions from the centre line of each of the layers concerned will thus constitute alternately the long side walls of box-shaped funnel openings to adjacent gaps in the contact body. In this way the contact body 10 will be subdivided at its top into several groups of openings, in the shown embodiment two groups, which optionally can be supplied with water or be kept dry. By placing the distribution pipes 42, 44 into recesses 43 in the lateral walls of the funnels and providing discharge openings (which are not visible in the figure because they are positioned at the underside of the pipes) at optional funnel-shaped mouths, water can optionally be supplied to predetermined gaps in the contact body. In the embodiment shown in FIG. 3, for example, water is supplied to each box-shaped funnel adjacent each other in the transverse direction of the contact body, which implies that water will be poured into each second gap in the contact body, while gaps positioned therebetween will be kept dry. For distribution of the water in the longitudinal direction of the body a plurality of pipes 42, 44 are arranged, their number in the shown example being two. When now air enters the contact body at places indicated by the arrow 16 (see also FIG. 1) the air leaving the contact body 10 will be constituted by alternately dry, preheated air currents and moistened air currents, as has been described above. In order to cause the water to be sprayed more quickly in the contact body 10, at least the upper portion of the body may have corrugations with a minor angle to the horizontal plane, as is disclosed in the co-pending U.S. Patent Application Ser. No. 944,246 filed Sept. 21, 1978 concurrently herewith.

Figure 5:
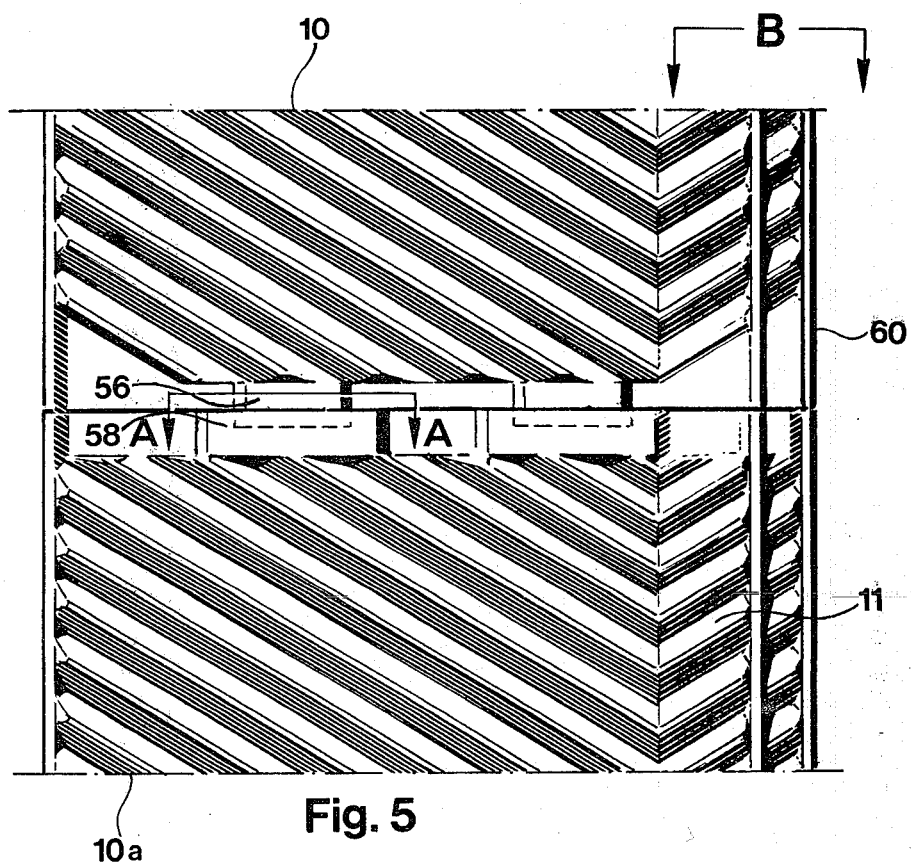
FIG. 5 is a side view of vertical jointing of two contact bodies.
Figure 5A:
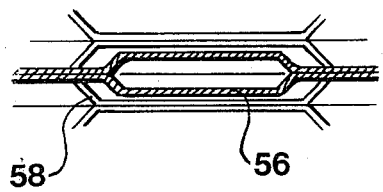
FIG. 5a shows a section following the line A—A in FIG. 5.

In the embodiment of cooling towers shown in FIG. 1 several contact bodies 10 are mounted one on top of the other, their number in the shown case being two bodies. In order to ensure maintenance of the subdivision into dry or wet channels through the entire cooling tower fill, the upper contact body 10 and the lower contact body 10a in FIG. 1 have a specific shape at the surfaces facing one another, which shape is shown in FIGS. 5 and 5a. The layers in the upper contact body will in the manufacturing process at the bottom side also be formed with widened portions in a manner similar to that at the top side, the widened portions at the bottom side being devised when the layers are joined together to form the contact body to define a socket 56 which has connection with those gaps or channels which on the top side of the contact body are supplied with water through the distribution pipes 42, 44. The layers of the lower contact body 10a are in the manufacturing process also formed with widened portions in the manner which has been described above, which widening portions in the assembling operation form a socket 58 which, however, has greater length and width than the socket 56. When assembling the contact bodies 10 and 10a to form a cooling tower fill, the arrangement is such that the sockets 56 protrude down into the sockets 58, which also have connection with every second channel or gap in the lower contact body 10a. In this way, there is ensured a transfer of water from the upper contact body 10 to the lower body 10a in every second passageway only without any water being capable of migrating over into the dry channels or gaps.

Figure 6:
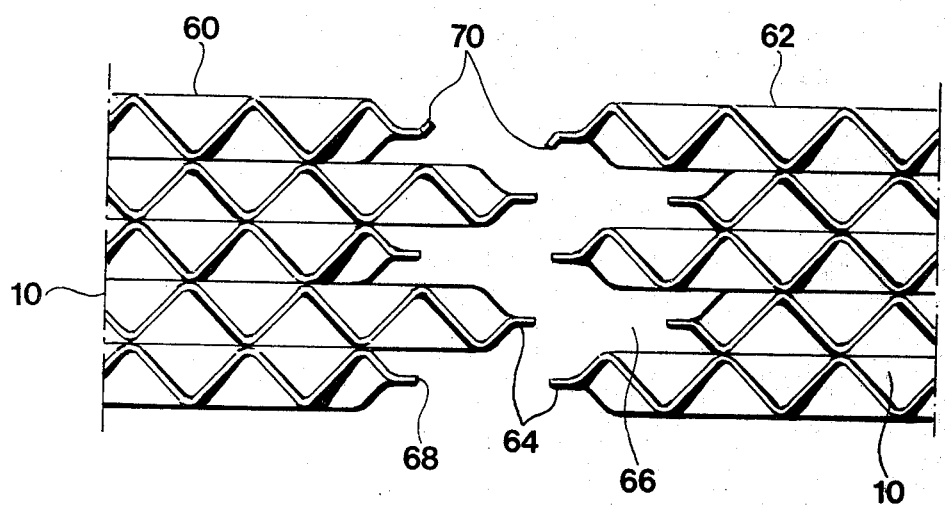
FIG. 6 is a top view of a portion of lateral jointing of two contact bodies, the left-hand part of FIG. 6 corresponding to the view B—B in FIG. 5.
Figure 7:
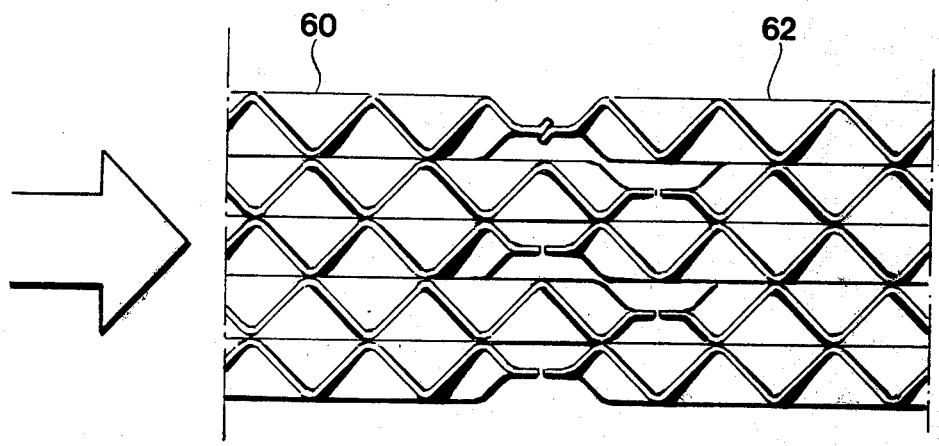
FIG. 7 shows a view similar to FIG. 6 of the contact bodies when brought together.

In order to join together the contact bodies 10 in lateral direction while maintaining the subdivision into wet and dry channels, the lateral faces of the contact bodies also have a specific shape which is shown in FIGS. 6 and 7. The left-hand part of FIG. 6 corresponds here to the lateral edge 60 of the contact body 10 in FIG. 5 viewed along the line B—B, whereas the right-hand part of FIG. 6 constitutes the reversed lateral edge 62 of an adjacent package.

As is evident from the FIGS. 6 and 7, every second layer of the contact body 10 is longer and every second one shorter in the fill so that a zigzag-shaped edge face is formed. When the packages are put together, as shown in FIG. 7, the tongues 64 thus formed in every second layer 10 will project into the gap 66 formed between the tongues of the opposed package. The edges 68 of the layers 10 are shaped, e.g. planed, to make good contact with one another. By the arrangement with tongues 64 and gaps 66 a guiding for the plane edge portions of the layers 10 is obtained so as to make sure that they will bear against each other.

The main object with this jointing is to keep the moist and the dry air separated from each other at the transition from one package or body 10 to the next following package or body 10. This is rendered possible by the fact that the pressure drop always is the same in the dry as well as in the wet channels, for which reason no tendency exists in the air to pass from one gap or channel into another. Therefore, the shown jointing with abutment of the edges 68 is sufficient to maintain the subdivision between dry and wet channels at a transition from one package 10 to the next one. To prevent water or water drops from becoming entrained by the air and passing over from the wet to the dry channels, the body is shaped so that the corrugations and the gaps formed by them at the edge sides of the body 10 run obliquely upwards so as to form drop separators, or so-called eliminators 11 (FIGS. 1 and 5), which trap the water to cause it to flow back towards the interior of the contact body. This is particularly important not only at the air discharge side, but also at the intake side since water may force its way to the edge and penetrate into the dry channels, for which reason the corrugations there, too, ought to have this upward inclination. The gaps then direct the air downwards at the intake side and upwards at the discharge side so that the air forces the water back into the interior of the body 10 or prevents the discharged air from entraining water from the interior of the contact body.

In order to reinforce the sealing effect between the edge portions, each of the opposed edge portions may have, as is shown in FIGS. 6 and 7 for the upper layers, over its entire length a sealing flange 70 which is bent out in opposite directions so that a broader sealing surface is formed along the entire length of the edge. This is especially suitable when the sheets of material forming the layers of the contact body 10 are thin.

Figure 2:
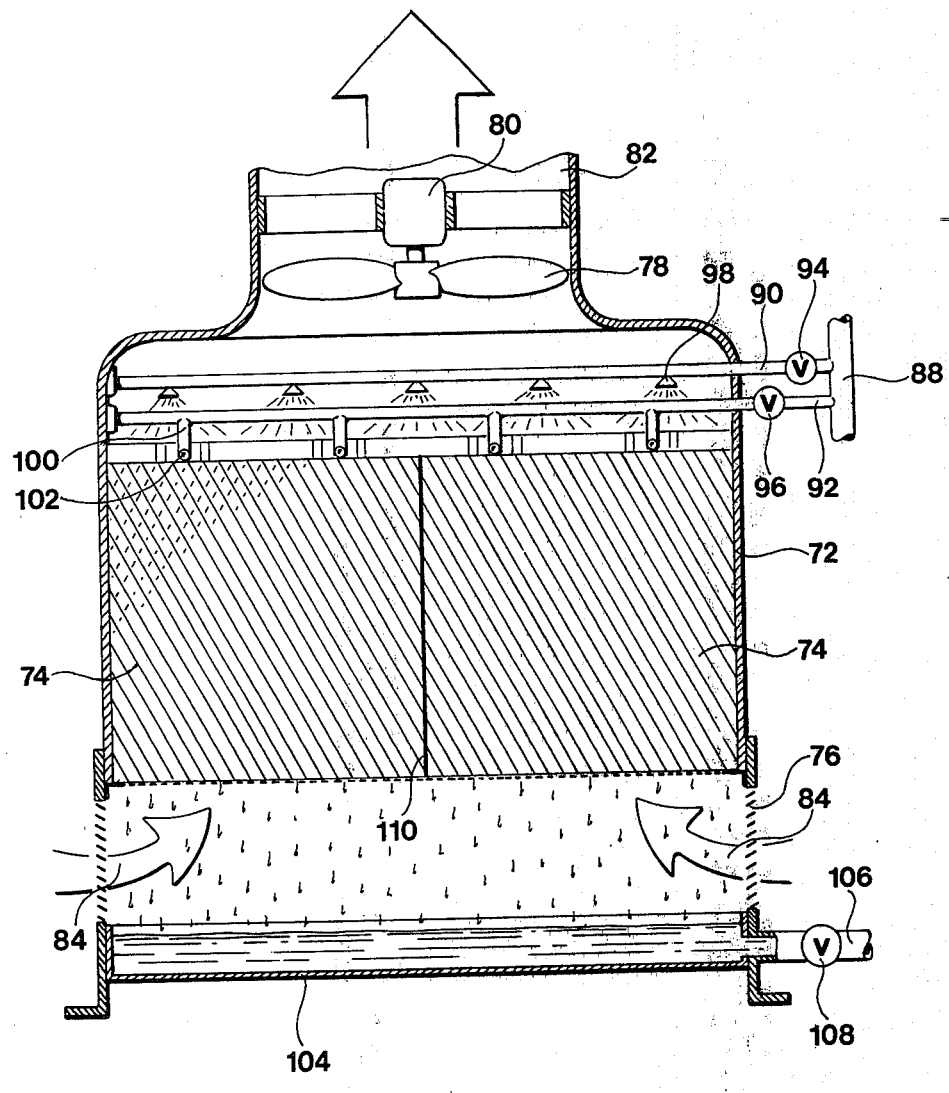
FIG. 2 shows a similar section as presented in FIG. 1 through a cooling tower of the counter-current type.

In the embodiment shown in FIG. 2, the invention is illustrated applied to a cooling tower of the counter-current type which comprises a casing 72 housing contact bodies 74 built up in the same manner as the contact bodies 10, which manner has been described in connection with FIG. 1. Through openings 76 in the casing, atmospheric air is sucked in by an impeller member 78 with driving motor 80 located in an opening 82. The sucked-in air which is marked by the arrows 84, is blown out after the passage through the bodies 74 into the opening 82 as is indicated by the arrow 36. Positioned above the contact bodies are water distributing systems comprising a main 88 and two branch pipes the water supply to which is controlled by valves 94, 96. The branch pipe 90 is positioned above the packages 74 and equipped with sprayers 98 which distribute the water over the entire top face of the packages or contact bodies 74 when water is supplied to the pipe 90. The other branch pipe 92 is in connection with branch pipes 100 which open into distribution pipes 102 mounted horizontally in the top faces of the contact bodies 74 and described in more detail with reference to FIG. 4. The cooled water which has passed through the bodies 74 is collected in a sump 104 at the bottom of the tower and is discharged through a pipe 106 controlled by a valve 108 to the place of utilization. In the embodiment shown in FIG. 2 the cooling tower has two fills or bodies 74 located side by side. The bodies 74 are at their facing sides attached to a sealing wall 110 which prevents water from penetrating around the corners of the layers into the dry channels. This kind of sealing is rendered possible by the fact that air and water in counter-current mainly flow vertically through the packages and not laterally (unless where caused by the inclination of the channels). Thus, any jointing in lateral direction is not required and normally neither in vertical direction, since the overall height of counter-current towers normally is 1500 mms at the utmost. However, if desired, a vertical jointing can be made in the manner shown in FIGS. 5 and 5a.

Figure 4:
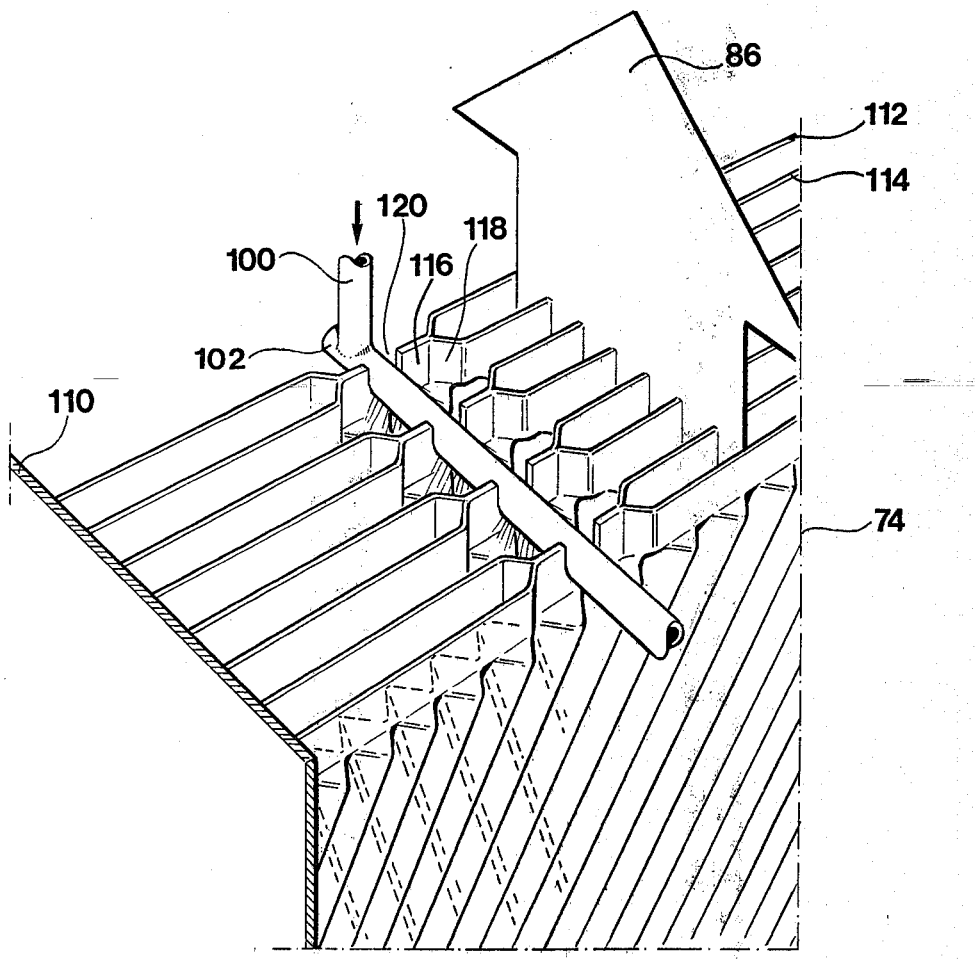
FIG. 4 is a perspective view of the top part of a contact body for the cooler of FIG. 2.

The contact body 74 presented in more detail in FIG. 4, consists of corrugated layers 112, 114. These have at the edge a plane, vertically upwards projecting edge part or rim which is positioned centrally over corrugations of the layer, which edge part in the manufacturing process is formed with laterally widened portions 116 connected with the central edge portion or rim via intermediate portions 118. When the layers are assembled with the widened portions 116 facing one another, said widened portions 116 will form a box-shaped, funnel-like mouth or outlet to the gaps or channels in every second layer. The distribution pipes 102 are located in recesses 120 in the lateral walls of the funnel-shaped boxes and are formed with downwards directed holes or openings (not visible) through which water can be supplied to the box and from there to the associated channel or gaps. As long as water is supplied to the branch pipes 92, 100 and 102 only, water will be poured into every second channel of the contact body 74, whereas water will be poured into all channels of the contact body when water is supplied to the pipe 90 and the sprayers 98.

The shown water supply affords, in addition to the possibility of effectively subdividing the contact bodies into wet and dry channels, further advantages such as a lower overall height due to the embedding of the water distribution pipes in the contact body, while simultaneously solving the splash problems mentioned by way of introduction hereto.

As is evident from the above, a device has been provided for subdividing the contact body into wet and dry channels in a simple and effective way. It is obvious in this connection that the shown embodiments are examples only of ways of realizing the invention and that they can be varied in many respects without departing from the basic inventive idea. Thus, it is not always necessary to retain the subdivision into wet and dry channels through the entire body, instead this subdivision may, where suitable, be limited to that part of the tower where the air leaves the same. In this connection, the jointing shown in FIGS. 5 and 5a between the fill packages or contact bodies may be eliminated, for example. In case of cross-current flow a mist-free part can be built in at the discharge side of the body 10, where the air leaves the same. Similarly, the water supply or the fills may be formed so that every third or every fourth channel is kept dry or any other combination be made depending on the heat load, danger of formation of mist etc. Instead of pipes for the water supply every other suitable supply means, such as troughs having various shape such as having different sections for different parts of the contact body may, of course, be applied.

I claim:

1. A contact body of the multilayer type comprising at least one pair of contact body units, located one on top of another within a casing, said contact body units each comprising a plurality of adjacent layers having upper and lower edges at least one of which abuts an adjacent body above or below it in their longitudinal direction, said layers in said contact body units being alternately bent along said edges, transversely to said longitudinal direction, with adjacent bent edge portions of adjacent layers being interconnected, whereby the layers cooperate to define at least two groups of openings in the contact body which communicate only with corresponding openings in an adjacent contact body above or below it, at least one group of openings having the shape of sockets with one socket being telescopically inserted only into another single corresponding opening in an adjacent contact body.

2. In an evaporative cooler including, a casing, at least one contact body of the multi-layer type located in said casing and formed with channels existing between the layers and which all are passed by air, and means for supplying water to selected channels in said body from above the body, the improvement comprising said contact body comprising layers having top longitudinally extending edges formed with recurrent laterally outward widened portions that correspond to the laterally outward widened portions of adjacent layers for forming elongated water supply openings at the top of the contact body whereby the contact body is subdivided at its top into at least two groups of elongated openings of which at least one of the groups communicates with part of the channels only, such group being disposed in relation to said water supply means to be supplied with water and define water carrying channels while the other group of openings define water-free openings leading to water-free channels; said layers having corrugations formed therein inclined to the vertical, with the corrugations in each layer crossing the corrugations on adjacent layers thereby to distribute the water supply in a lateral direction to those portions of the water carrying channels that are located below the water-free group of openings; said contact body being formed of at least two adjacent contact body units having facing side edges, with the layers of each units, at said facing edges being alternately displaced relatively to one another whereby certain edges project from the unit to form tongues defining gaps therebetween, which tongues are received in the gaps defined between the projecting tongues of the adjacent unit; said layer edges being formed to take a position in front of one another in opposite layers for counteracting communication between neighboring gaps.

* * * * *